United States Patent
Hashimoto et al.

(10) Patent No.: US 8,258,935 B2
(45) Date of Patent: Sep. 4, 2012

(54) DEVICE AND METHOD FOR WARNING OF LANE DEVIATION DETECTION

(75) Inventors: Kazuma Hashimoto, Anjo (JP); You Ryu, Anjo (JP)

(73) Assignee: Denso Corporation, Kariya (JP)

( * ) Notice: Subject to any disclaimer, the term of this patent is extended or adjusted under 35 U.S.C. 154(b) by 472 days.

(21) Appl. No.: 12/657,464

(22) Filed: Jan. 21, 2010

(65) Prior Publication Data

US 2010/0188200 A1 Jul. 29, 2010

(30) Foreign Application Priority Data

Jan. 27, 2009 (JP) .................. 2009-015606

(51) Int. Cl.
*B60Q 1/00* (2006.01)
*G05D 1/00* (2006.01)

(52) U.S. Cl. ........ 340/435; 340/436; 340/438; 340/903; 701/1; 180/167

(58) Field of Classification Search .................. 340/435
See application file for complete search history.

(56) References Cited

U.S. PATENT DOCUMENTS

| | | | |
|---|---|---|---|
| 6,057,754 A | 5/2000 | Kinoshita et al. | |
| 7,212,901 B2 * | 5/2007 | Sadano et al. | 701/70 |
| 2003/0072471 A1* | 4/2003 | Otsuka et al. | 382/103 |
| 2006/0228000 A1 | 10/2006 | Miyajima et al. | |
| 2007/0225914 A1* | 9/2007 | Kawazoe et al. | 701/301 |

FOREIGN PATENT DOCUMENTS

| | | |
|---|---|---|
| JP | 7-89443 | 4/1995 |
| JP | 07-105498 | 4/1995 |
| JP | 08-185599 | 7/1996 |
| JP | 09-156437 | 6/1997 |
| JP | 11-25397 | 1/1999 |
| JP | 11-031300 | 2/1999 |
| JP | 11-31300 | 2/1999 |
| JP | 11-066494 | 3/1999 |
| JP | 2006-209510 | 8/2006 |
| JP | 2006-209519 | 8/2006 |
| JP | 2006-331304 | 12/2006 |
| JP | 2007-331714 | 12/2007 |
| JP | 2008-117054 | 5/2008 |

OTHER PUBLICATIONS

Office action dated Feb. 8, 2011 in corresponding Japanese Application No. 2009-015606.
Office action dated Nov. 9, 2010 in corresponding Japanese Application No. 2009-015606.

* cited by examiner

*Primary Examiner* — Donnie Crosland
(74) *Attorney, Agent, or Firm* — Harness, Dickey & Pierce, PLC

(57) ABSTRACT

In a driving lane deviation detection and warning system, a deviation detection ECU suppress a warning unit to supply a warning when an obstacle placed in a front of a vehicle is detected, and the driver's operation allows the vehicle to deviate from a driving lane. That is, when the driver's operation allows the vehicle to deviate from the driving lane in order to escape any collision with an obstacle, the deviation detection ECU instructs the warning unit to prevent the supply of a warning to the driver. This prevents the warning unit to provide an unnecessary warning to the driver even if the driver intends for the vehicle to deviate from the current driving lane of the vehicle. That is, it is possible to reliably instruct the warning unit to supply the warning to the driver when the vehicle deviates from the current driving lane against the driver's will.

6 Claims, 6 Drawing Sheets

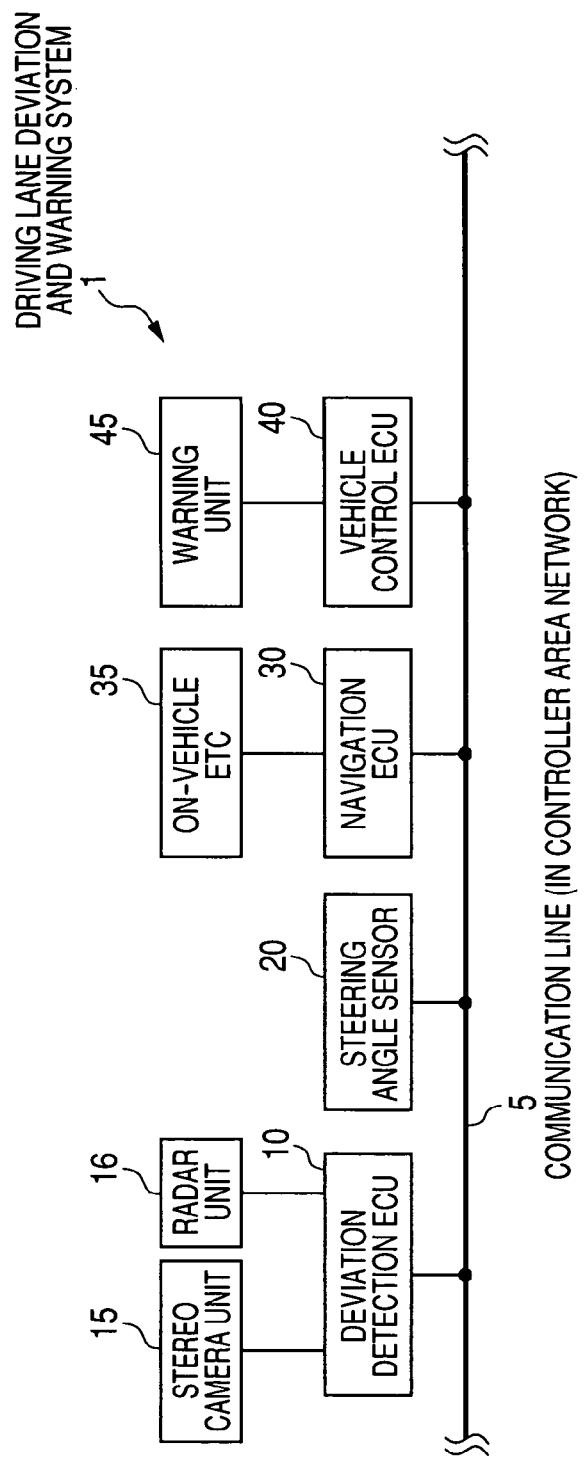
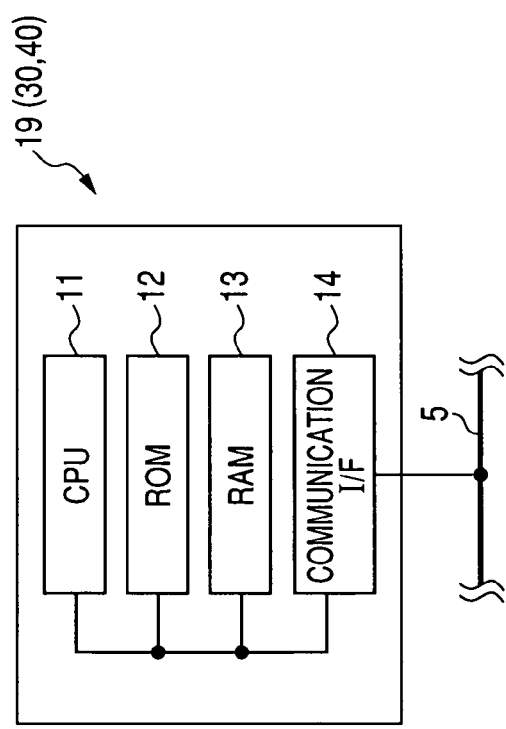
FIG. 1A
FIG. 1B

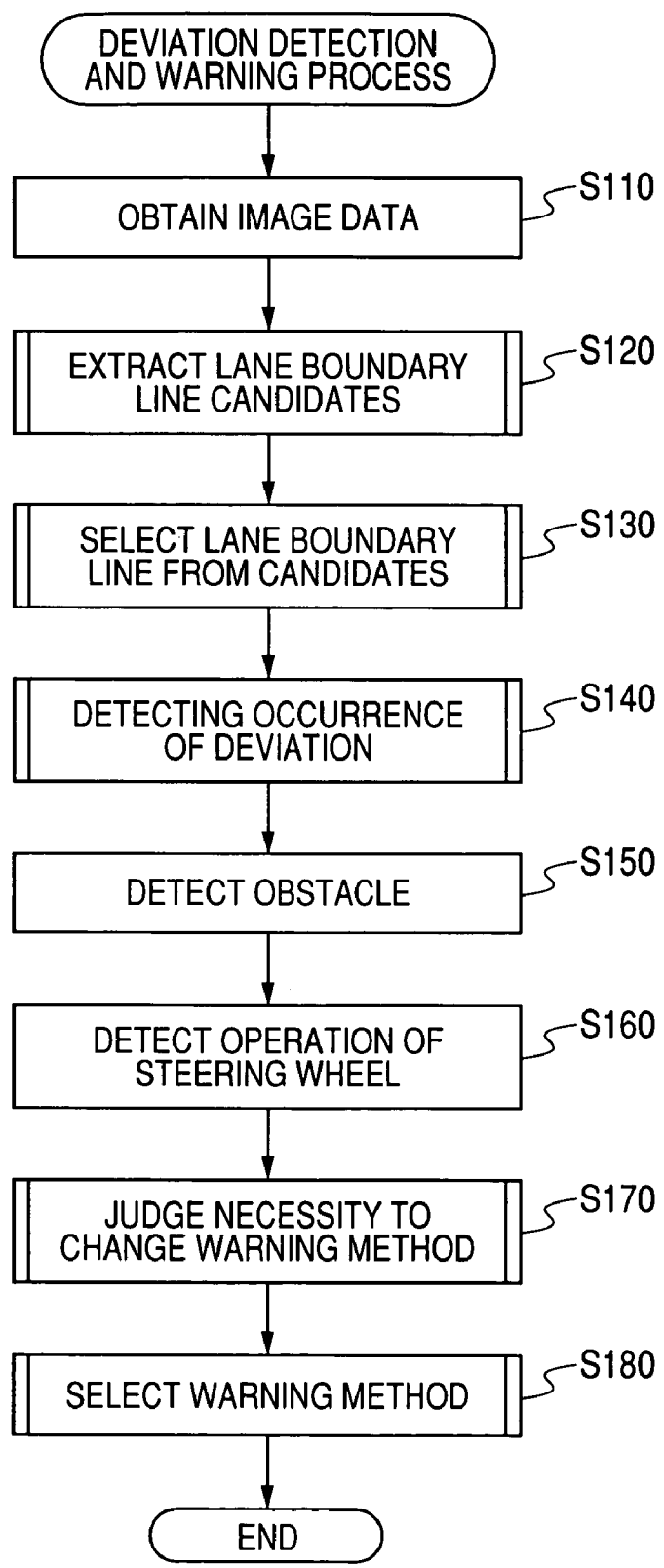

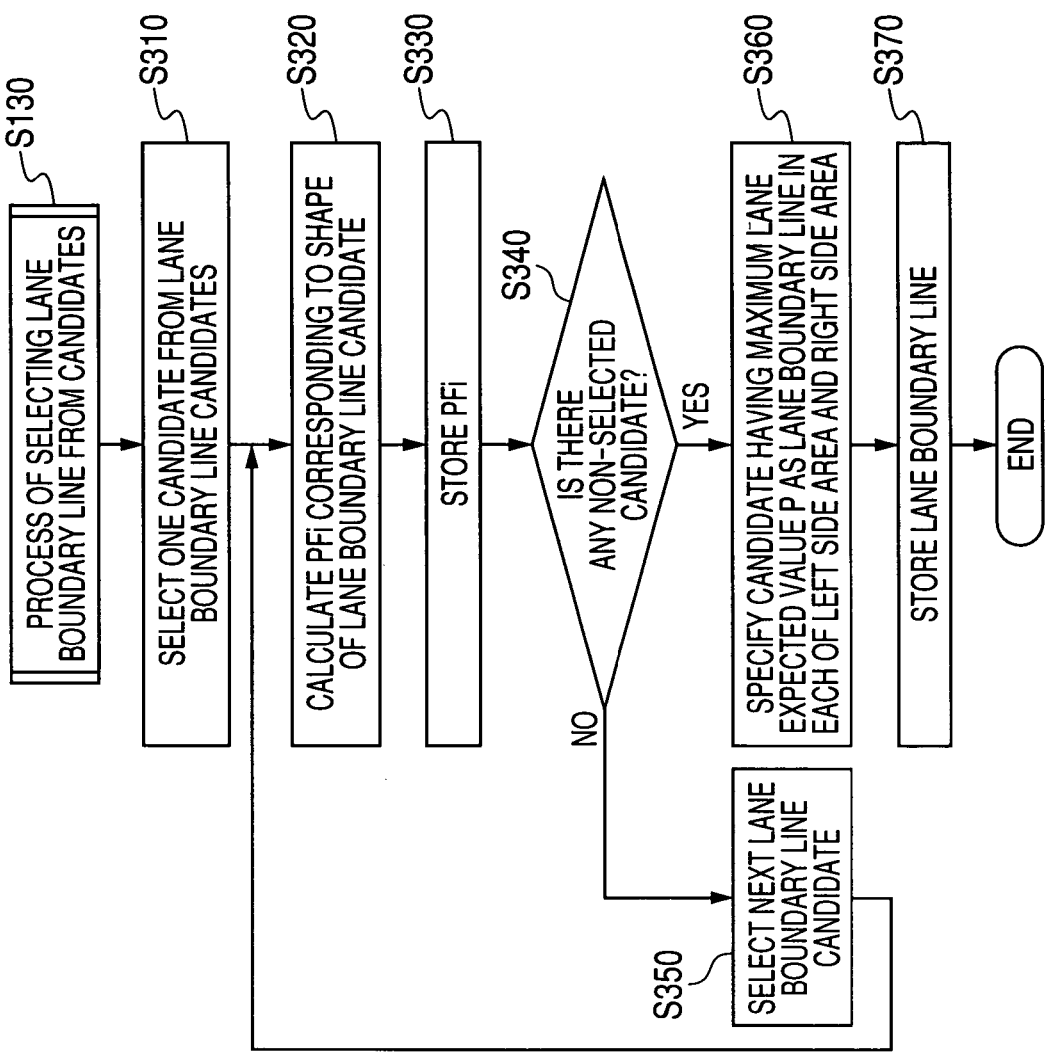
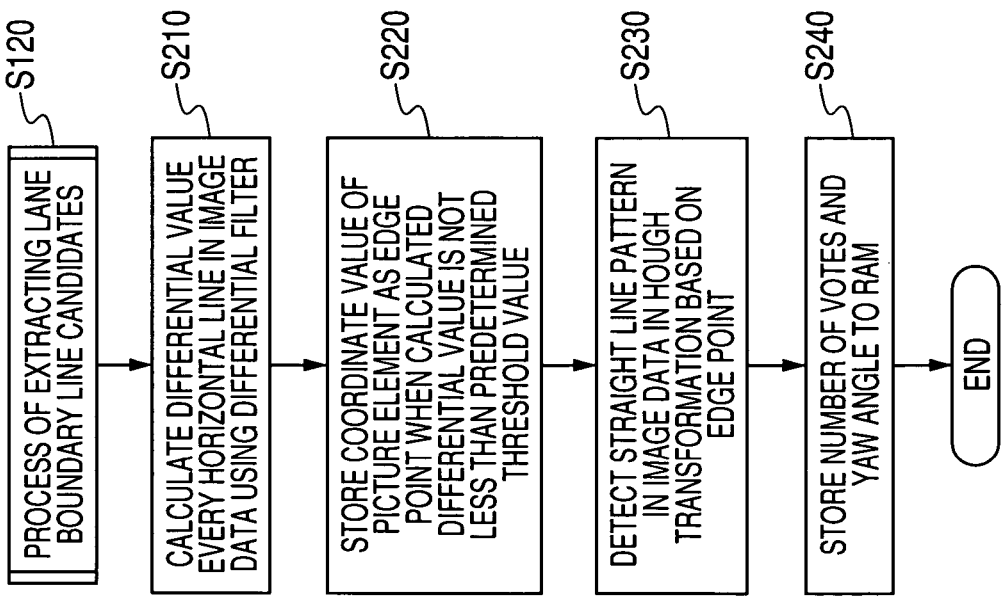

DEVICE AND METHOD FOR WARNING OF LANE DEVIATION DETECTION

CROSS-REFERENCE TO RELATED APPLICATION

This application is related to and claims priority from Japanese Patent Application No. 2009-15606 filed on Jan. 27, 2009, the contents of which are hereby incorporated by reference.

BACKGROUND OF THE INVENTION

1. Field of the Invention

The present invention relates to a device and a method for warning of lane deviation detection. That is, this invention relates to a deviation detection and warning device, to be mounted on a vehicle, to detect a probability of a vehicle deviating from a current driving lane on which a vehicle is running and instructs a warning unit, and a program to perform such a deviation detection and warning.

2. Description of the Related Art

There is a known technique to detect a driving lane on which a vehicle (hereinafter, referred to as the "driver's vehicle") is running, and generate and provide a warning of a probability of the vehicle deviating from the driving lane. For example, Japanese patent No. 3332500 disclosed such a technique.

In addition, there is another known technique to detect whether or not there is another possible driving lane, and suppress the warning when the detection result indicates the presence of another possible driving lane. For example, Japanese patent NO. 3358709 disclosed such a technique.

However, the above conventional technique suppresses the warning when there is another possible driving lane even if the driver does not intend for the driver's vehicle to deviate from the current driving lane. As described above, the conventional techniques do not provide an optimum and accurate warning to the driver of the vehicle when the driver's vehicle accidentally deviates from the current driving lane, namely, without any driver's will to switch the current driving lane to another lane.

SUMMARY OF THE INVENTION

It is an object of the present invention to provide a device and method for warning of lane deviation detection. In particular, the device and program accurately provide a necessary and optimum warning, for example, regarding a probability of the driver's vehicle deviating from a current driving lane while avoiding a troublesome warning.

To achieve the above purposes, the present invention provides a deviation detection and warning device to be mounted on a vehicle. The deviation detection and warning device detects a probability of the vehicle deviating from a current driving lane, and instructs a warning unit to provide a warning, or to prevent supplying a warning to the driver of the vehicle. The deviation detection and warning device is comprised of a lane boundary line detection means, a deviation judgment means, a warning instruction means, an obstacle detection means, an operation detection means, and a suppression means. The lane boundary line detection means detects a lane boundary line as a boundary of the driving lane on which the vehicle is running. The lane boundary line is contained in image data of an area in a driving direction of the vehicle. The deviation judgment means detects an approaching speed of the vehicle toward the detected lane boundary line, and judges a probability of the vehicle deviating from the driving lane based on the detected approaching speed.

The warning instruction means instructs a warning means to provide a warning to the driver of the vehicle when the probability of the vehicle deviating from the driving lane is higher than a predetermined reference value. The obstacle detection means detects an obstacle which is in the driving direction of the vehicle. The operation detection means detects an operation of the driver of the vehicle to allow the vehicle to deviate from the driving lane. The suppression means suppresses the warning instruction means to instruct the warning means to warn a warning to the driver when the obstacle detection means detects an obstacle and the operation detection means detects the operation of the driver of the vehicle to allow the deviation of the vehicle from the driving lane.

That is, the deviation detection and warning device according to the invention detects the driver's operation to allow the vehicle to deviate from the current driving lane in order to escape from any collision of the vehicle with an obstacle. When detecting such a driver's operation, the deviation detection and warning device suppresses the warning means from generating and providing the warning.

Accordingly, the deviation detection and warning device having the above configuration makes it possible to escape the supply of an unnecessary warning to the driver through the warning unit (which serves as a warning means) when the driver allows the vehicle to deviate from the current driving lane. In other words, it is for the deviation detection and warning device to instruct the warning means to certainly supply a necessary warning to the driver of the vehicle when the vehicle deviates from the current driving lane against the driver's will. It is therefore possible for the deviation detection and warning device to instruct the warning means to supply an optimum and necessary warning to the driver while preventing the driver from receiving unnecessary warnings.

The operation of the driver of the vehicle to allow the vehicle to deviate from the current driving lane detected by the operation detection means is to operate the steering wheel of the vehicle, to switch directional indicators or directional signals, or to work klaxon as an electromechanical horn or alerting device.

In addition, it is sufficient to specify a central area rather than the lane boundary line in the image data as the driving lane when there is a demand to specify the driving lane.

In the configuration of the deviation detection and warning device of the present invention, the process to reduce a warning level indicates the operation to decrease a warning level (for example, decreasing the brightness of warning lamps or the number of a plurality of warning units when the warning means activate using light, sound, and vibration), or to perform the warning after elapse of a constant period of time, to issue the warning in a short time, to inhibit any warning, or to perform any method to distract the driver's notice.

It is possible for the deviation detection and warning device according to the invention to further have an obstacle extracting means to extract an obstacle (for example, an obstacle placed in the driving lane or in an area close to the driving lane) having a possibility to prevent safe driving of the vehicle due to the detected obstacles. It is further possible for the suppression means to suppress the warning instruction means from instructing the warning means when the operation detection means detects the driver's deliberate operation.

It is possible for the deviation detection and warning device to further have an area detection means and a suppression inhibiting means. The area detection means compares a width of a possible driving area including the lane driving line to allow the vehicle to enter with a predetermined reference width, when the vehicle approaches the lane driving line. The suppression inhibiting means prevents the suppression means from suppressing the warning instruction means to instruct the warning means to supply the warning to the driver when the area detection means detects that the width of the possible driving area is less than the predetermined reference width.

The deviation detection and warning device having the above configuration provides the instruction to the warning means to supply a warning when the vehicle may cause a dangerous situation by deviating from the current driving lane when there is only a small area of less than a predetermined width in the outside of the current driving lane even if the driver allows the vehicle to deviate from the current driving lane.

According to the deviation detection and warning device of the invention, it is possible to obtain more safe driving of the vehicle because of not suppressing the instruction to instruct the warning means (or warning unit) in order to halt the supply of a warning to the driver of the vehicle when there is a probability of the vehicle causing a collision with an obstacle when the vehicle derives from the current driving lane.

In the deviation detection and warning device according to the present invention, it is possible for the area detection means to extract an obstacle that is present in the area including the lane boundary line from the obstacles detected by the obstacle detection means, and specify an area between the lane boundary line and the extracted obstacle as the possible driving area.

According to the deviation detection and warning device of the invention, it is possible for the area detection means to easily specify the possible driving area by using the detection result obtained from the obstacle detection means. When the obstacle detection means does not detect the obstacle, it is sufficient for the area detection means to specify the entire area including the lane boundary line as the possible driving area.

According to the deviation detection and warning device of the invention, it is possible for the area detection means to specify, as the possible driving area, an area which does not contain any edge component regarding an obstacle in the area including the lane boundary line in the image data.

The deviation detection and warning device according to the invention judges whether an edge component in the image data, which corresponds to the lane boundary line, has a possibility to be an obstacle such as stairs or a precipice (that is, which is not any possible driving area). On the other hand, the deviation detection and warning device according to the invention judges that the area without any edge component is a possible driving area.

The deviation detection and warning device of the invention having the above configuration instructs the warning unit to provide the warning when the vehicle enters the area including an edge component in the image data.

In accordance with another aspect of the invention, there is provided a computer program having a function to detect a risk of the vehicle deviating from a driving lane of the vehicle, and provide a warning to a driver of the vehicle. The computer program comprises steps of: (a) detecting a lane boundary line as a boundary of the driving lane, on which the vehicle is running, in image data of an area in a driving direction of the vehicle; (b) detecting the approaching speed of the vehicle towards the detected lane boundary line, and judging the probability of the vehicle deviating from the driving lane based on the detected approaching speed; (c) instructing a warning means to warn the possible deviation to the driver of the vehicle when the probability for the vehicle deviating from the driving lane is higher than a predetermined reference value; (d) detecting an obstacle which is present in the driving direction of the vehicle; (e) detecting an operation of the driver of the vehicle to allow the deviation of the vehicle from the driving lane; and (f) suppressing the instruction to instruct the warning means to supply a warning to the driver when the presence of the obstacle is detected and it is detected that the driver is changing the driving lane to avoid the obstacle.

The above computer program has the function to detect the probability of the vehicle deviating from the current driving lane of the vehicle, and provide a warning to the driver of the vehicle. The computer program of the invention makes it possible to obtain these effects of the deviation detection and warning device.

BRIEF DESCRIPTION OF THE DRAWINGS

A preferred, non-limiting embodiment of the present invention will be described by way of example with reference to the accompanying drawings, in which:

FIG. 1A is a block diagram showing a schematic configuration of a deviation detection and warning device according to an embodiment of the present invention;

FIG. 1B is a block diagram showing a schematic configuration of a deviation detection ECU equipped with the driving lane deviation detection system shown in FIG. 1A;

FIG. 2 is a flow chart showing a deviation detection and warning process performed by the deviation detection ECU shown in FIG. 1B;

FIG. 3A is a flow chart showing a process of extracting lane boundary line candidates from image data;

FIG. 3B is a flow chart showing a process of selecting an optimum lane boundary line from the lane boundary line candidates;

DETAILED DESCRIPTION OF THE PREFERRED EMBODIMENTS

Figure 4:
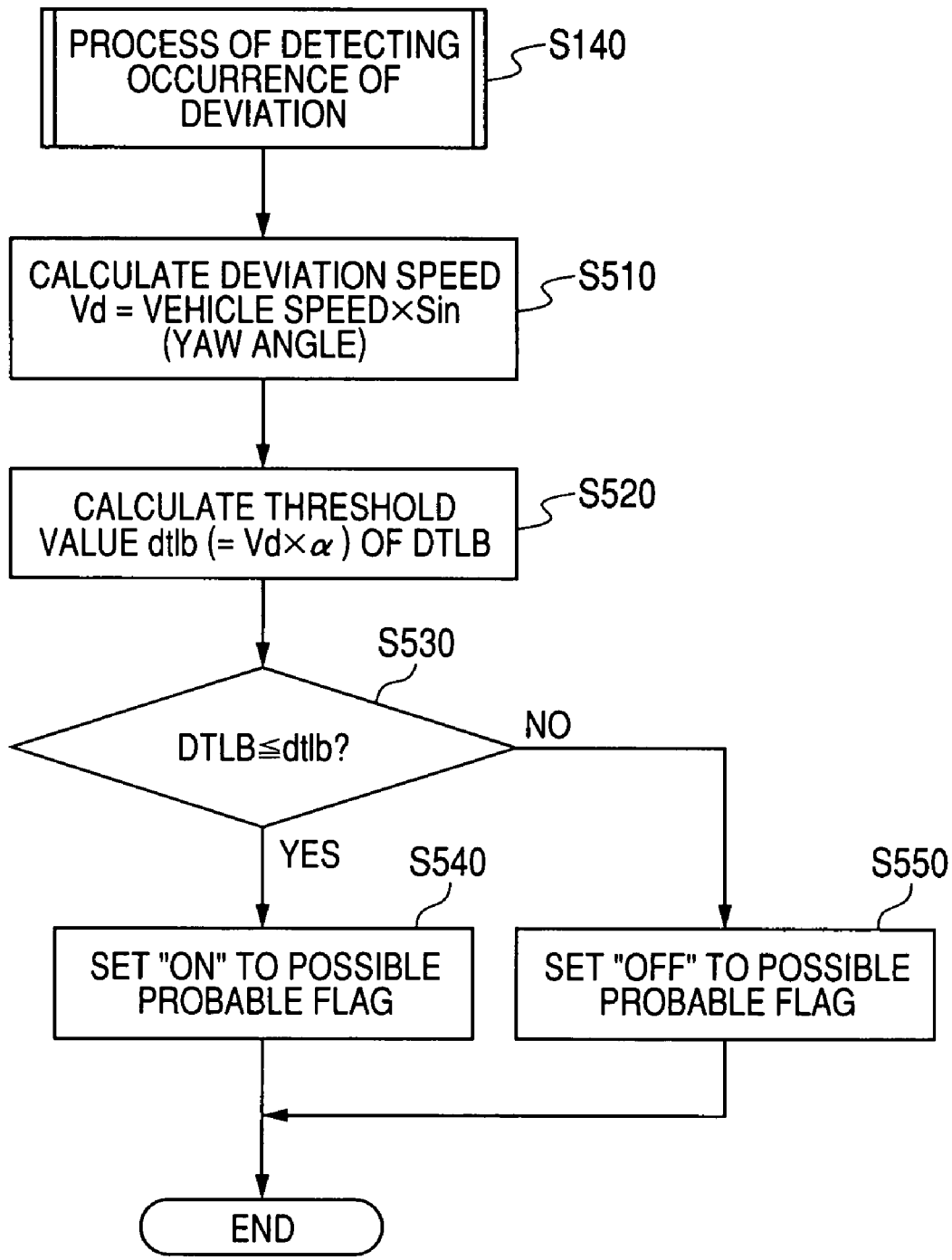
FIG. 4 is a flow chart showing a process of detecting whether or not a driver's vehicle deviates from a current driving lane.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of an embodiment of a driving lane deviation detection and warning system 1 according to an embodiment of the present invention with reference to FIG. 1A and FIG. 1B to FIG. 6.

FIG. 1A is a block diagram showing a schematic configuration of the driving lane deviation detection and warning system 1 according to the embodiment of the invention. FIG. 1B is a block diagram showing a schematic configuration of a deviation detection ECU 10 in the driving lane deviation detection and warning system 1 shown in FIG. 1A.

The driving lane deviation detection and warning system 1 shown in FIG. 1A is mounted onto a passenger vehicle (hereinafter, referred to as the driver's vehicle"), for example. The driving lane deviation detection and warning system 1 detects occurrence of deviating the driver's vehicle from a current driving lane. The driving lane deviation detection and warning system 1 further has a function of generating and providing an optimum warning of a possible deviation from the current driving lane to the driver of the vehicle.

As shown in FIG. 1A, the driving lane deviation detection and warning system 1 is comprised of the deviation detection electronic control unit 10 (as the deviation detection ECU 10) as the deviation detection and warning device), a steering angle sensor 20, a navigation ECU 30, and a vehicle control ECU 40 (serving as a warning means). The deviation detection ECU 10, the steering angle sensor 20, the navigation ECU 30, and the vehicle control ECU 40 are communicated through a communication line 5 in a controller area network (CAN) using a communication protocol. This CAN makes it possible to communicate with the deviation detection ECU 10, the steering angle sensor 20, the navigation ECU 30, and the vehicle control ECU 40 to each other. The deviation detection ECU 10 connects with a stereo camera unit 15 and a radar unit 16.

The stereo camera unit 15 is composed of a pair of cameras placed at a front right side and a front left side of the driver's vehicle. Those cameras forming the stereo camera unit 15 are separated from a predetermined distance in order to detect or take an image of the surface of a front road of the driver's vehicle. That is, the deviation detection ECU 10 processes image data transferred from the pair of cameras forming the stereo camera unit 15, and detects one or more obstacles present in the front of the driver's vehicle based on the processed image data.

The radar unit 16 transmits radio waves or electromagnetic waves or laser light toward the front side of the driver's vehicle, and then receives reflected waves reflected from an object such as an obstacle which is present at the front area of the driver's vehicle. The radar unit 16 is a widely-known radar system to detect a position of an obstacle and a schematic shape thereof. The deviation detection ECU 10 is configured to receive image data and detection results of such an obstacle at an optional timing.

The navigation ECU 30 is connected to an on-vehicle electronic toll collection (ETC) 35. The navigation ECU 30 is configured to receive information for the driver's vehicle to pass through a toll gate in a highway transferred and toll information transferred from the on-vehicle ETC 35. The navigation ECU 30 provides the toll information regarding the passing through of the toll gate based on a request from the deviation detection ECU 10.

As shown in FIG. 1B, the deviation detection ECU 10 is comprised of a central processing unit (CPU) 11, a read only memory (ROM) 12, a random access memory (RAM) 13, and a communication interface (I/F) 14. Through the communication I/F 14, the deviation detection ECU 10 performs various types of processes: (a) to obtain necessary information to detect a driving lane and a lane boundary line, which is a boundary of the driving lane on which the driver's vehicle is running, transferred from the other ECUs and sensors; and (b) to generate and provide a warning regarding a possible deviation. The deviation detection ECU 10 performs those processes based on a computer program (including a deviation warning program) stored in the ROM 12.

Because the hardware configuration of each of the navigation ECU 30 and the vehicle control ECU 40 is similar to that of the deviation detection ECU 10, the explanation of them is omitted here.

The vehicle control ECU 40 is electrically connected to a warning unit 45 comprised of a speaker and a display unit.

The vehicle control ECU 40 serves as a warning device to provide the warning to the driver of the vehicle when instructing the warning unit 45 to operate in order to provide the warning when the driver's vehicle deviates from the driving lane on which the driver's vehicle is running. The vehicle control ECU 40 also serves as a steering torque control device in order to prevent the driver's vehicle from deviating from the current driving lane, and to avoid any occurrence of a traffic accident.

A description will now be given of the driving lane deviation detection and warning process performed by the driving lane deviation detection and warning system 1 with reference to FIG. 2.

Figure 5:
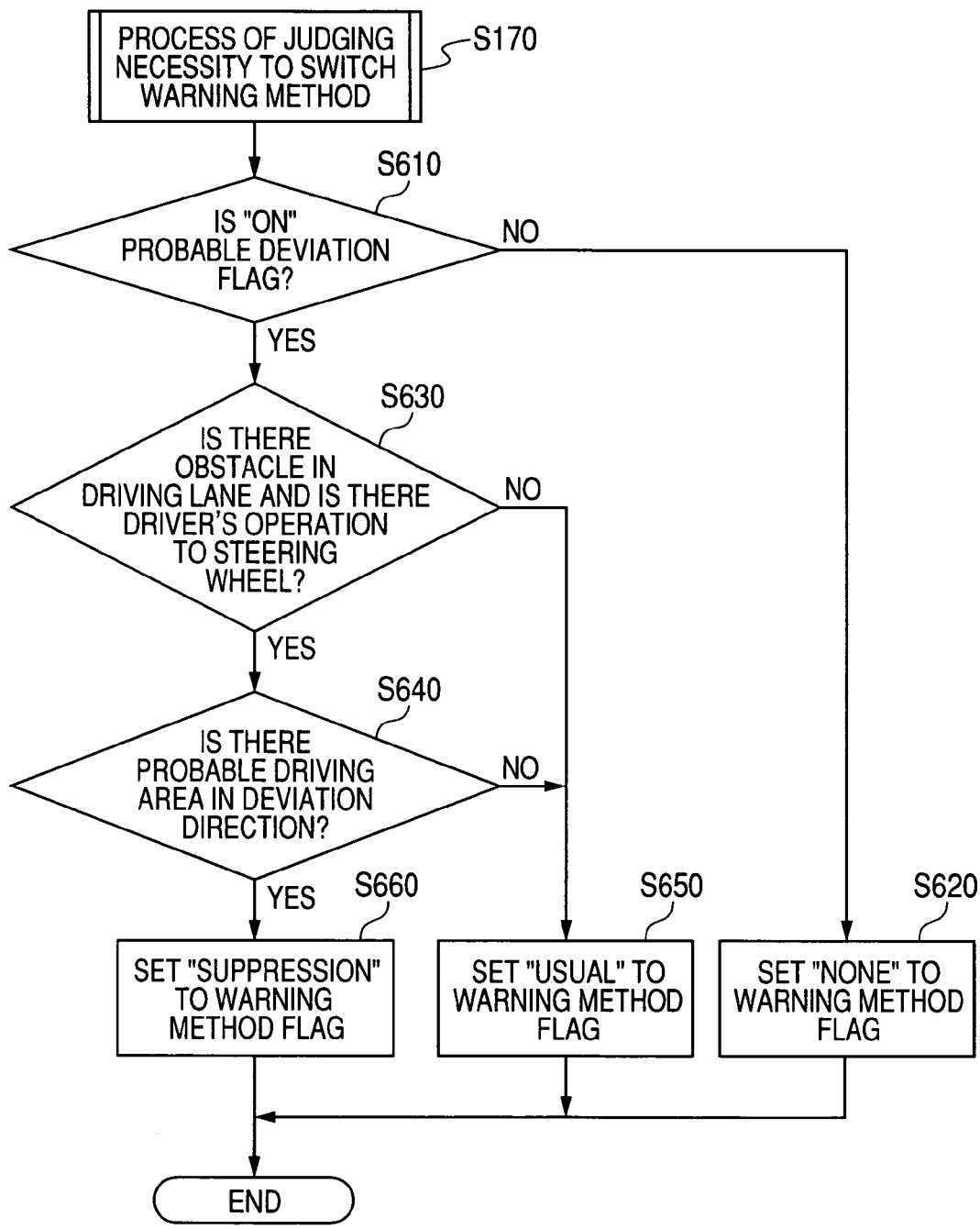
FIG. 5 is a flow chart showing a process of judging a necessity to switch a warning method.
Figure 6:
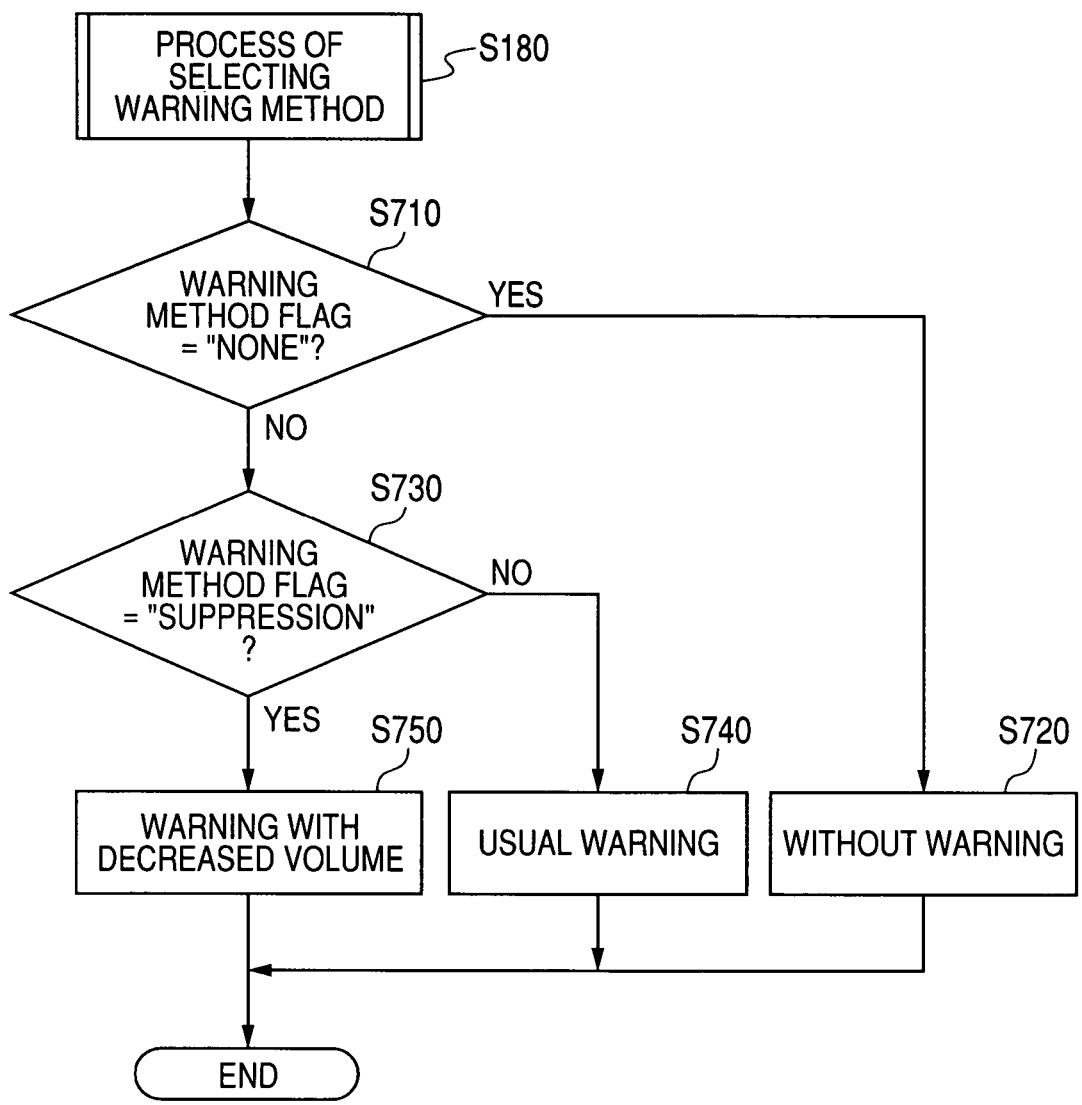
FIG. 6 is a flow chart showing a process of selecting an optimum warning method.

FIG. 2 is a flow chart showing a deviation detection and warning process performed by the deviation detection ECU 10 (having the structure shown in FIG. 1B) in the driving lane deviation detection and warning system 1 shown in FIG. 1A. FIG. 3A is a flow chart showing a process of extracting lane boundary line candidates from the image data. FIG. 3B is a flow chart showing a process of selecting an optimum lane boundary line from the lane boundary line candidates. FIG. 4 is a flow chart showing a process of judging whether or not a driver's vehicle deviates from a current driving lane. FIG. 5 is a flow chart showing a process of judging a necessity to switch a warning method. FIG. 6 is a flow chart showing a process of selecting an optimum warning method.

The deviation detection and warning process is started when the driver of the vehicle turns on an electric power of an ignition switch. At first, the deviation detection ECU 10 performs the process of detecting an occurrence of the deviation from the current driving lane every predetermined time interval (for example, every 100 ms interval) after the turning-on of the ignition switch.

As shown in FIG. 2, the deviation detection ECU 10 detects lane boundary lines (at the right side and the left side) of the current driving lane, on which the driver's vehicle is running, from image data obtained by the stereo camera unit 15 (step S110, step S120, and step S130, serving as a lane detection means).

Specifically, the deviation detection ECU 10 receives the image data in the forward direction of the driver's vehicle obtained by the stereo camera 15.

The deviation detection ECU 10 performs the process of extracting lane boundary line candidates which represent a plurality of edge components in the image data arranged along the traveling direction of the driver's vehicle (step S120). It is possible to detect one of image data obtained from a pair of cameras forming the stereo camera unit 15.

Specifically, as shown in FIG. 3A, the deviation detection ECU 10 calculates a differential value every horizontal line (every pixel having a same coordinate value in a vertical direction) in the image data by using a differential filter (step S210).

That is, the deviation detection ECU 10 calculates a change ratio in luminance intensity between adjacent pixels in a plurality of picture elements forming the horizontal lines. When the stereo camera unit 15 is composed of color cameras, it is possible for the deviation detection ECU 10 to obtain a change ratio of color difference signals which are converted from RGB signals output from the color cameras to luminance signals and color difference signals.

The deviation detection ECU 10 detects whether or not the calculated differential value is not less than a predetermined threshold value. When the detection result indicates that the calculated differential value is not less than predetermined threshold value, the deviation detection ECU 10 stores the coordinate value of the picture element as an edge point (or an edge component) into the RAM 13 (step S220).

After completion of the above processes (steps S210 and S5220) for all of picture elements in the image data, the operation flows goes to step S230.

The deviation detection ECU 10 performs a Hough transformation process based on the edge points stored in the RAM 13 in order to detect all of straight line patterns which extend toward the traveling direction of the driver's vehicle, where each of the straight line patterns has a yaw angle of less than a predetermined value, and the yaw angle is an angle between the traveling direction of the driver's vehicle and the straight line. The deviation detection ECU 10 performs a labeling process for each of the straight line patterns as lane boundary candidates (step S230).

The labeling process assigns a number "i" (where i= 0, 1, . . . , and n) to each of the lane boundary candidates. The deviation detection ECU 10 then stores the number of votes (corresponding to the number of edge points used in detection of each straight line) in a Hough transformation process and information regarding the yaw angle into the RAM 13 (step S140). The deviation detection ECU 10 completes the process (step S120) of extracting candidate lines from lane boundary lines shown in FIG. 2 and FIG. 3A.

Next, the operation flow goes to step S130 shown in FIG. 2. The deviation detection ECU 10 performs the process of selecting the lane boundary line from a plurality of straight line patterns as the lane boundary line candidates (step S130).

As shown in FIG. 3A, the deviation detection ECU 10 selects one (i=0) of the lane boundary line candidates extracted by the process of extracting the lane boundary line candidate (step S310).

Next, the deviation detection ECU 10 calculates a lane expected value (PFi) which indicates a possibility of the lane boundary line candidate as the lane boundary line based on the shape of the lane boundary line candidate (step S320).

In the embodiment of the invention, the higher the number of votes stored by the process in step S240, the larger the expected value. That is, the higher number of votes in the Hough transformation indicates a long straight line.

The above process calculates the lane expected value (PFi) corresponding to the shape of the lane boundary line candidate based on the number of votes in the Hough transformation. The present invention is not limited by the process. For example, it is possible to prefer a straight line to a curved line (in order to have a higher possibility), or a solid line to a dotted line.

When the navigation ECU 30 provides information regarding the width of the driving lane on which the driver's vehicle is running, it is possible form the deviation detection ECU 10 to estimate an area to detect the lane boundary line according to the width of the driving lane, and to apply a higher possible value to each of the lane boundary line candidates which are present in the estimated area.

The deviation detection ECU 10 stores the obtained lane expected values (PFi) into the RAM 13 (step S330). The deviation detection ECU 10 detects whether or not all of the lane boundary line candidates are selected (step S340). When there is no selected candidate ("NO" in step S340), the deviation detection ECU 10 selects next lane boundary line candidates (i< . . . i+1) (step S350), and performs the process of steps S320 and S330 shown in FIG. 3B.

On the other hand, the deviation detection ECU 10 selects all of the lane boundary line candidates ("YES" in step S340), the deviation detection ECU 10 specifies the lane boundary line candidate having the maximum lane expected value (PFi) as the lane boundary line (step S360). At this time, the deviation detection ECU 10 selects, as the lane boundary lines in a right side area and a left side area, the traveling component corresponding to the maximum possibility (Pi) in each of the areas which is divided into the right side area and the left side area based on the position (at the central line in the image data, for example) which are observed from the position corresponding to the front area of the driver's vehicle in the image data.

The deviation detection ECU 10 stores the selected lane boundary line into the RAM 13 (step S370). The deviation detection ECU 10 completes the process of selecting the lane boundary line. The deviation detection ECU 10 can recognize, as the driving lane, the central area observed from each of the lane boundary line in the image date.

The deviation detection ECU 10 performs the process of detecting occurrence of deviation from the driving lane (step S140). That is, this process detects an approaching speed of the driver's vehicle toward the lane boundary line, and calculates a probability of the driver's vehicle deviating from the detected driving lane based on the approaching speed.

Specifically, as shown in FIG. 4, the deviation detection ECU 10 calculates the deviation speed (Vd) by multiplying yaw angle and a vehicle speed (step S510), where the deviation speed (Vd) is an approaching speed of the driver's vehicle toward the lane boundary line, yaw angle is an angle between the extending direction of the lane boundary line and the traveling direction of the driver's vehicle. By the way, the yaw angle has been calculated by the Hough transformation process in step S230 and stored in the RAM 13 by the process (step S240).

The deviation detection ECU 10 calculates a threshold value (dtlb) of a distance to the line boundary (DTLB) (step S520). This threshold value (Dtlb) can be obtained by multiplication of the deviation speed (Vd) and a reference time ($\alpha$, for example, 2 seconds).

The deviation detection ECU 10 compares the distance to the line boundary (DTLB) with the threshold value (dtlb) in order to detect whether or not the driver's vehicle deviates from the driving lane within the reference time ($\alpha$).

When the distance to the line boundary (DTLB) is not more than the threshold value (dtlb) ("YES" in step S530), the deviation detection ECU 10 determines that the driver's vehicle would deviate from the driving lane, and sets a value indicating "ON" to a deviation probable flag stored in the RAM 13 (step S540). The deviation detection ECU 10 completes the process of detecting the occurrence of deviation.

On the other hand, when the distance to the line boundary (DTLB) is more than the threshold value (dtlib) ("NO" in step S530), the deviation detection ECU 10 detects that the driver's vehicle would not deviate from the driving lane, and sets a value indicating "OFF" to the deviation probable flag stored in the RAM 13 (step S550), and completes the process of detecting occurrence of deviating from the driving lane.

Next, the deviation detection ECU 10 performs the process of detecting obstacle (step S150, which serves as obstacle detection means).

There are various types of methods to detect the obstacle which is present at the front area of the driver's vehicle. It is possible to select one of:

(a) a method of extracting an obstacle which is present in the driving direction of the driver's vehicle based on the detection results of the radar unit 16;

(b) a method of extracting a group of edge components corresponding to an obstacle from the image data, (such as a pattern matching method);

(c) a method of detecting edge components from each image data obtained by the stereo camera unit 15, and detecting an obstacle of a three dimensional shape by detecting an offset of the edge components in each image data; and (d) a method of detecting a pair of lamps in the image data when the driver's vehicle is detected during a dark condition such as night.

There are various types of obstacles to the driver's vehicle such as an on-coming vehicle which is coming toward the driver's vehicle, a forward vehicle which is running in front of the driver's vehicle, a walking person, and stairs.

This process detects an obstacle placed in the area within the driving lane or in a wide area (within a detection area by the stereo camera unit 15 and the radar unit 16) including a neighborhood of the driving lane. The deviation detection ECU 10 then stores the position information (including a distance between the driver's vehicle and the obstacle and a direction of the obstacle to the front direction of the driver's vehicle) of the detected obstacle into the RAM 16.

The deviation detection ECU 10 detects whether or not the driver of the vehicle allows the driver's vehicle to deviate from the current driving lane (step S160, which serves as operation detection means).

Specifically, the deviation detection ECU 10 in the driving lane deviation detection and warning system 1 according to the embodiment of the invention monitors or detects the driver's operation to the steering wheel of the driver's vehicle. Such a driver's operation of the steering wheel can be detected by repeatedly receiving the detection results transferred from the steering angle sensor 20. In the following process (step S630), the deviation detection ECU 10 detects the occurrence of the operation of the steering wheel when an amount of changing the angle of the steering wheel is not less than a constant angle per unit time.

Next, the deviation detection ECU 10 performs the process of judging a necessity to change a warning method (step S170). As shown in FIG. 5, the deviation detection ECU 10 detects the state of the deviation probable flag stored in the RAM 13 (step S610).

When the deviation probable flag is OFF ("NO" in step S610), the deviation detection ECU 10 sets a value indicating "none" of warning to a warning method flag (step S620). This warning method flag indicates the optimum warning type of the warning (or the optimum warning method). The deviation detection ECU 10 then completes the process of judging a necessity to change a warning method.

The ON state of the deviation probable flag ("YES" in step S610) indicates a higher possibility of occurrence for the driver's vehicle to deviate from the driving lane, which is higher than a reference value (as a threshold value) regarding the possibility of deviation. In this case, the driving lane deviation detection and warning system 1 provides warning to the driver of the vehicle.

The following process selects the optimum warning method. Specifically, the deviation detection ECU 10 detects the presence of an obstacle placed on the driving lane or on a neighbor area of the driving lane of the driver's vehicle and the operational state of the steering wheel by the driver of the vehicle (step S630). This process extracts possible obstacles (which are present on the driving lane or the neighbor area of the driving lane) which would prevent the driver's vehicle from being driven safely.

When there is no obstacle on the driving lane or the neighbor area thereof or the driver of the vehicle does not operate the driving wheel, ("NO" in step S630), the deviation detection ECU 10 sets a value indicating a normal condition to the warning method flag stored in the RAM 13 (step S650). The deviation detection ECU 10 completes the process of judging a necessity to change the current warning method.

On the other hand, when the detection result indicates the presence of an obstacle on the driving lane or the neighbor area of the driving lane and the presence of the operation of the steering wheel by the driver of the vehicle ("YES" in step S630), the deviation detection ECU 10 detects whether or not there is any escape area in a driving direction for the driver of the vehicle to avoid any collision with the obstacle (step S640, serving as an escaping area detection means and a suppression inhibiting means).

In this process, the deviation detection ECU 10 reads the information regarding the position of the obstacle stored in the RAM 13, and extracts the information relating to the target obstacles which are present in the area including the lane boundary, and finally specifies the area, as a possible driving area, the area between the lane boundary and the extracted one or more target obstacles in the image data. The deviation detection ECU 10 simultaneously reads the coordinate data of the edge components corresponding to the lane boundary line candidates stored in the RAM 13. When the coordinate data contain the edge components having the coordinate data corresponding to the area including the lane boundary, the deviation detection ECU 10 specifies the area from the lane boundary line to the edge components as the possible driving area.

That is, in order to ensure detection of the target obstacle on specifying the possible driving area, the deviation detection ECU 10 recognizes, as the obstacle, the edge component which does not correspond to an obstacle in the process in step S630, and specifies, as the possible driving area, the area including no obstacles and edge components. This procedure can increase sensitivity when detecting obstacles.

When the driving lane deviation detection and warning system 1 misses or overlooks the target obstacle in the process of step S630, the supply of the warning to the driver of the vehicle is only suppressed.

On the other hand, when the driving lane deviation detection and warning system 1 overlooks the presence of the target obstacle in the process of step S640, the supply of the warning to the driver of the vehicle is suppressed in spite of being approaching the area including the target obstacle.

The driving lane deviation detection and warning system 1 having the deviation detection ECU 10 according to the embodiment can prevent such an error operation to suppress the supplying of a necessary warning.

In the above process, it is possible for the deviation detection ECU 10 to compare the width of the possible driving lane which is specified is compared with a reference width of a predetermined safety area to which the driver's vehicle enters even if the driver's vehicle deviates from the driving lane. When the comparison result indicates that the width of the possible driving area is not less than the above reference width, the deviation detection ECU 10 recognizes the presence of a possible driving area in the direction to avoid any collision of the driver's vehicle with an obstacle.

On the other hand, when the comparison result indicates that the width of the possible driving area is less than the above reference width, the deviation detection ECU 10 recognizes the absence of any possible driving area.

In the above process, when there is the possible driving area toward the direction to avoid any collision of the driver's vehicle with an obstacle ("YES" in step S640), the deviation detection ECU 10 sets a value indicating the suppression of providing the warning to the warning method flag stored in the RAM 13 (step S660, which serves as a suppressing means). The deviation detection ECU 10 then completes the process of judging a necessity of changing a warning method.

On the other hand, when there is no possible driving area toward the driving direction to avoid any collision of the driver's vehicle with an obstacle ("NO" in step S640), the deviation detection ECU 10 performs the process in step S650 previously described. That is, the judgment result in step S640 indicates no possible driving area, the deviation detection ECU 10 inhibits the warning suppression (serving as a suppression inhibition means).

When the process of judging a necessity to change a warning method is completed, the operation flow goes to step S180 (serving as a warning instruction means). In the process in step S180, the deviation detection ECU 10 instructs the vehicle control ECU 40 according to the value of the warning method flag. As shown in FIG. 6, the deviation detection ECU 10 checks the warning method flag stored in the RAM 13 (step S710 and step S730.

When the warning method flag indicates no necessity to provide any warning ("NO" in step S710), the deviation detection ECU 10 completes the above process without any instruction to provide a warning to the driver of the vehicle.

On the other hand, when the warning method flag indicates a necessity to provide a warning ("YES" in step S710 and "NO" in step S730), the deviation detection ECU 10 instructs the vehicle control ECU 40 to generate a normal warning (step S740). The deviation detection ECU 10 then completes the process of judging a necessity of changing a warning method.

By the way, when the warning method flag indicates the "suppression" ("YES" in step S710 and "YES" in step S730), the deviation detection ECU 10 instructs the vehicle control ECU 40 to decrease a volume of warning when compared with the volume of the usual warning (step S750). The vehicle control ECU 40 then completes the process of judging a necessity to change such a warning method. When receiving the instruction to decrease the volume of the warning transferred from the deviation detection ECU 10, the vehicle control ECU 40 indicates the warning unit 45 to issue the warning according to the received instruction.

Effects of the Embodiment

In the driving lane deviation detection and warning system 1 according to the embodiment of the invention, the deviation detection ECU 10 performs the deviation detection and warning process. In this deviation detection and warning process, the deviation detection ECU 10 detects the presence of an obstacle placed in a front area in the driving direction of the driver's vehicle. When detecting the presence of an obstacle and the operation of the driver deviating from the current driving lane to avoid the obstacle, the deviation detection ECU 10 instructs the warning unit to suppress the warning. That is, the deviation detection ECU 10 in the driving lane deviation detection and warning system 1 of the embodiment detects the driver's operation to allow the vehicle to deviate from the current driving lane in order to avoid a collision of the driver's vehicle with an obstacle, and then instructs the warning unit to suppress generation and supplying any warning based on the detection result through the vehicle control ECU 40 (see FIG. 1A and FIG. 5). Accordingly, the configuration of the driving lane deviation detection and warning system 1 makes it possible to avoid supplying any needless warning to the driver of the vehicle when the driver of the vehicle intends that the driver's vehicle deviates from the current driving lane. This can avoid inconveniencing the vehicle driver, and can supply an optimum warning method to the vehicle driver.

The deviation detection ECU 10 in the driving lane deviation detection and warning system 1 of the embodiment compares the width of the possible driving area of the driver's vehicle with the reference width of the predetermined area in the area including the lane boundary line to which the driver's vehicle is approaching. When a possible deviation is higher than the predetermined value, and the comparison result indicates that the width of the possible driving area is less than the reference width, the deviation detection ECU 10 instructs the vehicle control ECU 40 in order to inhibit the warning unit 45 to supply a warning to the driver of the vehicle.

That is, when there is a small possible driving area (within less than the reference width) even if the driver of the vehicle allows the driver's vehicle to deviate from the current driving lane, the deviation detection ECU 10 in the driving lane deviation detection and warning system 1 recognizes that the driver's vehicle is in a highly dangerous state when the driver's vehicle deviates from the current driving lane, and does not instruct the warning unit 45 (through the vehicle control ECU 40) to suppress the supply of the warning to the driver of the vehicle.

Because the deviation detection ECU 10 in the driving lane deviation detection and warning system 1 according to the embodiment of the invention does not suppress supplying any warning when the driver's vehicle may dangerously deviate from the current driving lane, the deviation detection ECU 10 does not instructs the vehicle control ECU 40 and the warning unit 45 to suppress supplying any warning. This can increase the safety of the driver's vehicle.

According to the driving lane deviation detection and warning system 1 having the above structure and operation, the deviation detection ECU 10 extracts the obstacles, which are present in the area including the lane boundary line, from all of detected obstacles, and then specifies the area, as the possible driving area, having a range from the lane boundary line to the extracted obstacle.

It is therefore possible for the driving lane deviation detection and warning system 1 to easily specify the possible driving area because of specifying it based on the detection results of the obstacles. When does not detect any obstacle in the area including the lane boundary line, the deviation detection ECU 10 in the driving lane deviation detection and warning system 1 can specify all of areas including the lane boundary line as the possible driving area.

In addition, the deviation detection ECU 10 specifies, as a possible driving area, the area which does not contain any edge component in the area including the lane boundary line in the image date obtained by the stereo camera unit 15.

That is, the deviation detection ECU 10 in the driving lane deviation detection and warning system 1 of the embodiment of the invention judges that the area including edge components as a possible area to contain stairs or a precipice (that is, which is not a possible driving area). On the other hand, the driving lane deviation detection and warning system 1 judges the area without any obstacle as the possible driving area.

According to the driving lane deviation detection and warning system 1 having the above structure and the operations, it is possible to supply the warning when the driver's vehicle enters such a possible obstacle area.

Another Embodiment

The concept of the present invention is not limited by the embodiment previously described. It is possible for the present invention to have various embodiments and modifications within the scope of the present invention.

The above embodiment of the invention previously described detects the driver's use of operating the steering wheel of the driver's vehicle as the driver's decision to allow the driver's vehicle to deviate from the current driving lane. However, the present invention is not limited by this. For example, it is possible to detect the driver's operation to switch directional indicators, directional signals, or the driver's operation to sound the horn such as an electromechanical horn or alerting device.

The above embodiment of the invention uses the process to reduce the volume of a warning when the warning method flag indicates the value "suppression". However, the present invention is not limited by this. For example, it is possible to suppress a warning level (for example, decreasing the brightness of warning lamps or the number of a plurality of warning means), or to perform the warning after elapse of a constant period of time, the warning of a short period of time, to inhibit any warning, or to perform any method to district the driver's notice.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A deviation detection and warning device, to be mounted on a vehicle, which detects a risk of the vehicle deviating from a driving lane of the vehicle, and instructs a warning means to supply a warning to a driver of the vehicle, comprising:
    lane boundary line detection means that detects a lane boundary line as a boundary of the driving lane, on which the vehicle is running, in image data of an area in a driving direction of the vehicle;
    deviation judgment means that detects an approaching speed of the vehicle toward the detected lane boundary line, and judges a probability of the vehicle deviating from the driving lane based on the detected approaching speed;
    warning instruction means that instructs a warning means to warn about the possible deviation to the driver of the vehicle when the probability of the vehicle deviating from the driving lane is higher than a predetermined reference value;
    obstacle detection means that detects an obstacle which is present in the driving direction of the vehicle;
    operation detection means that detects an operation of the driver of the vehicle to deviate from the driving lane; and
    suppression means that suppresses the warning instruction means from instructing the warning means to supply a warning to the driver when the obstacle detection means detects the obstacle and the operation detection means detects the operation of the driver of the vehicle to allow the deviation of the vehicle from the driving lane.

2. The deviation detection and warning device according to claim 1, further comprising:
    area detection means that compares a width of a possible driving area including the lane driving line to allow the vehicle to enter with a predetermined reference width, when the vehicle approaches the lane driving line; and
    suppression inhibiting means preventing the suppression means from suppressing the warning instruction means to instruct the warning means to supply the warning to the driver when the area detection means detects that the width of the possible driving area is less than the predetermined reference width.

3. The deviation detection and warning device according to claim 2, wherein the area detection means extracts an obstacle that is present in the area including the lane boundary line from the obstacles detected by the obstacle detection means, and specifies an area from the lane boundary line to the extracted obstacle as the possible driving area.

4. The deviation detection and warning device according to claim 2, wherein the area detection means specifies, as the possible driving area, an area which does not contain any edge component regarding an obstacle in the area including the lane boundary line in the image data.

5. The deviation detection and warning device according to claim 3, wherein the area detection means specifies, as the possible driving area, an area which does not contain any edge component regarding an obstacle in the area including the lane boundary line in the image data.

6. A computer program having a set of instructions embodied on a non-transitory computer readable medium to detect a probability of a vehicle deviating from a driving lane of the vehicle, and provide a warning to a driver of the vehicle, wherein the computer program comprising steps of:
    detecting a lane boundary line as a boundary of the driving lane, on which the vehicle is running, in image data of an area in a driving direction of the vehicle;
    detecting an approaching speed of the vehicle toward the detected lane boundary line, and judging a probability of the vehicle deviating from the driving lane based on the detected approaching speed;
    instructing a warning means to warn about the possible deviation to the driver of the vehicle when the probability of the vehicle deviating from the driving lane is higher than a predetermined reference value;
    detecting an obstacle which is present in the driving direction of the vehicle;
    detecting an operation of the driver of the vehicle to allow the deviation of the vehicle from the driving lane; and
    suppressing the instruction to instruct the warning means to supply a warning to the driver of the vehicle when the presence of the obstacle is detected and the operation of the driver of the vehicle to allow the deviation of the vehicle from the driving lane is detected.

* * * * *